Jan. 8, 1935.  E. G. KINGSTON  1,987,066
VERNIER ADJUSTING CONTROL UNIT
Filed Jan. 30, 1933   5 Sheets-Sheet 2
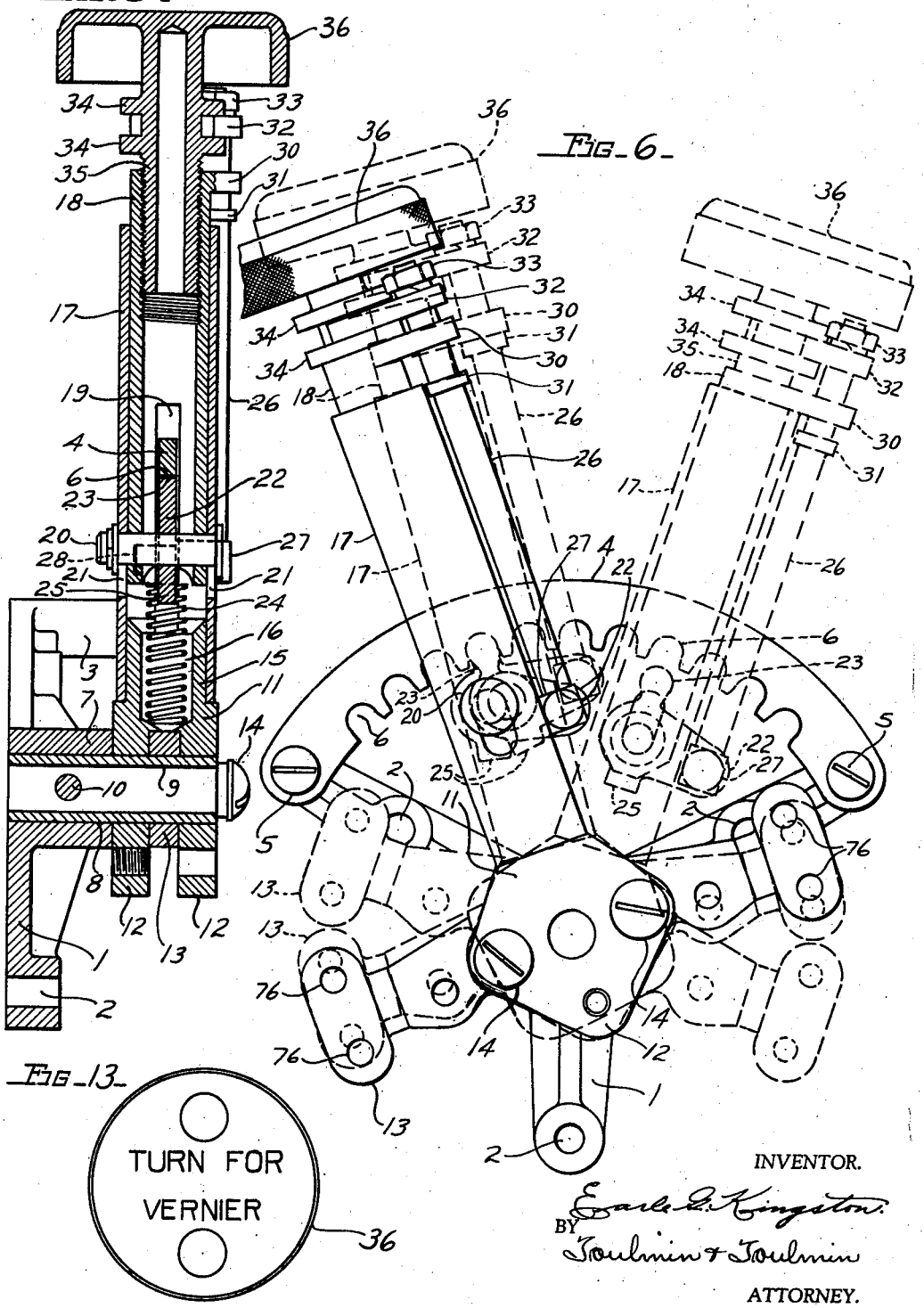
INVENTOR.
Earle G. Kingston
BY Toulmin & Toulmin
ATTORNEY.

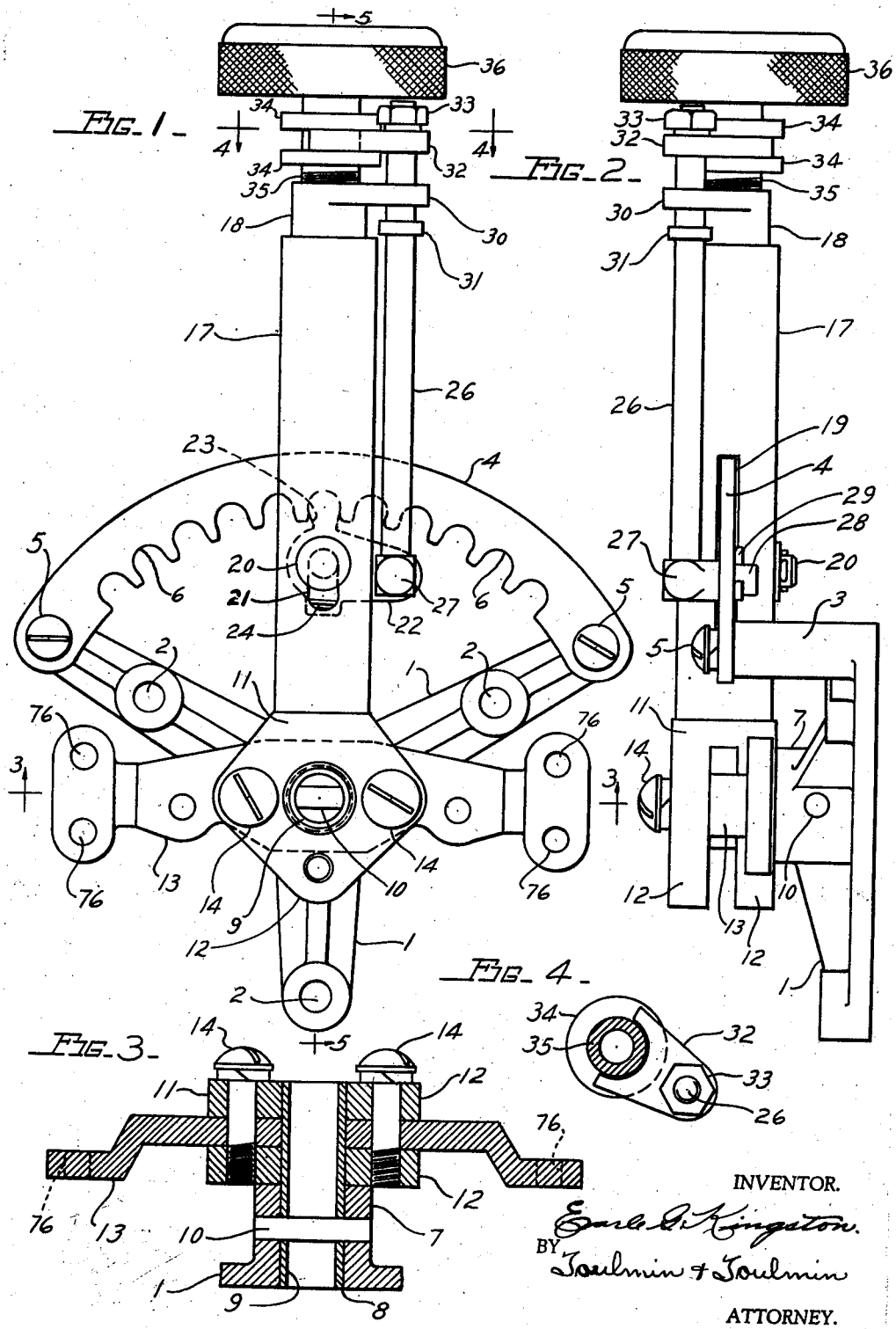

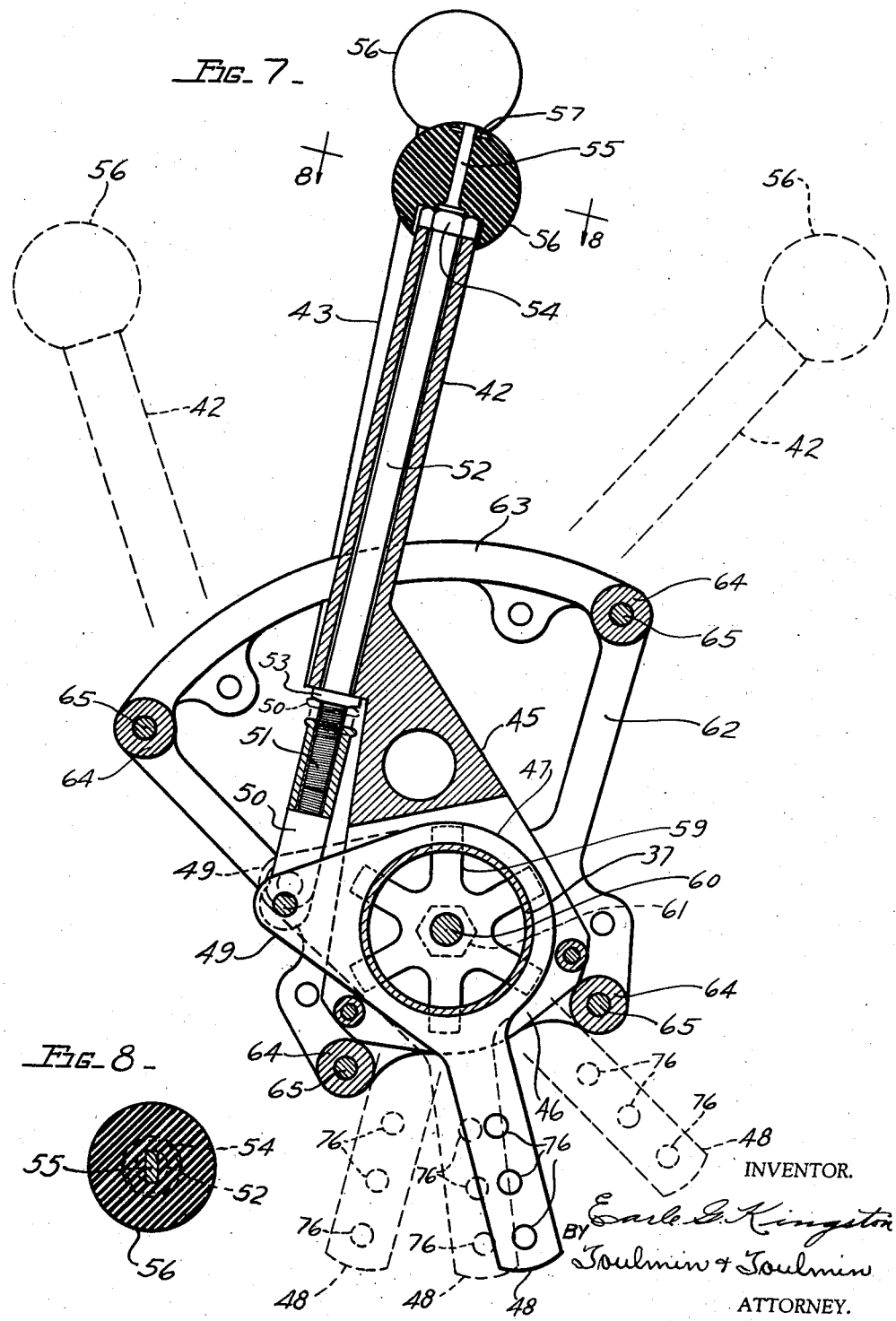

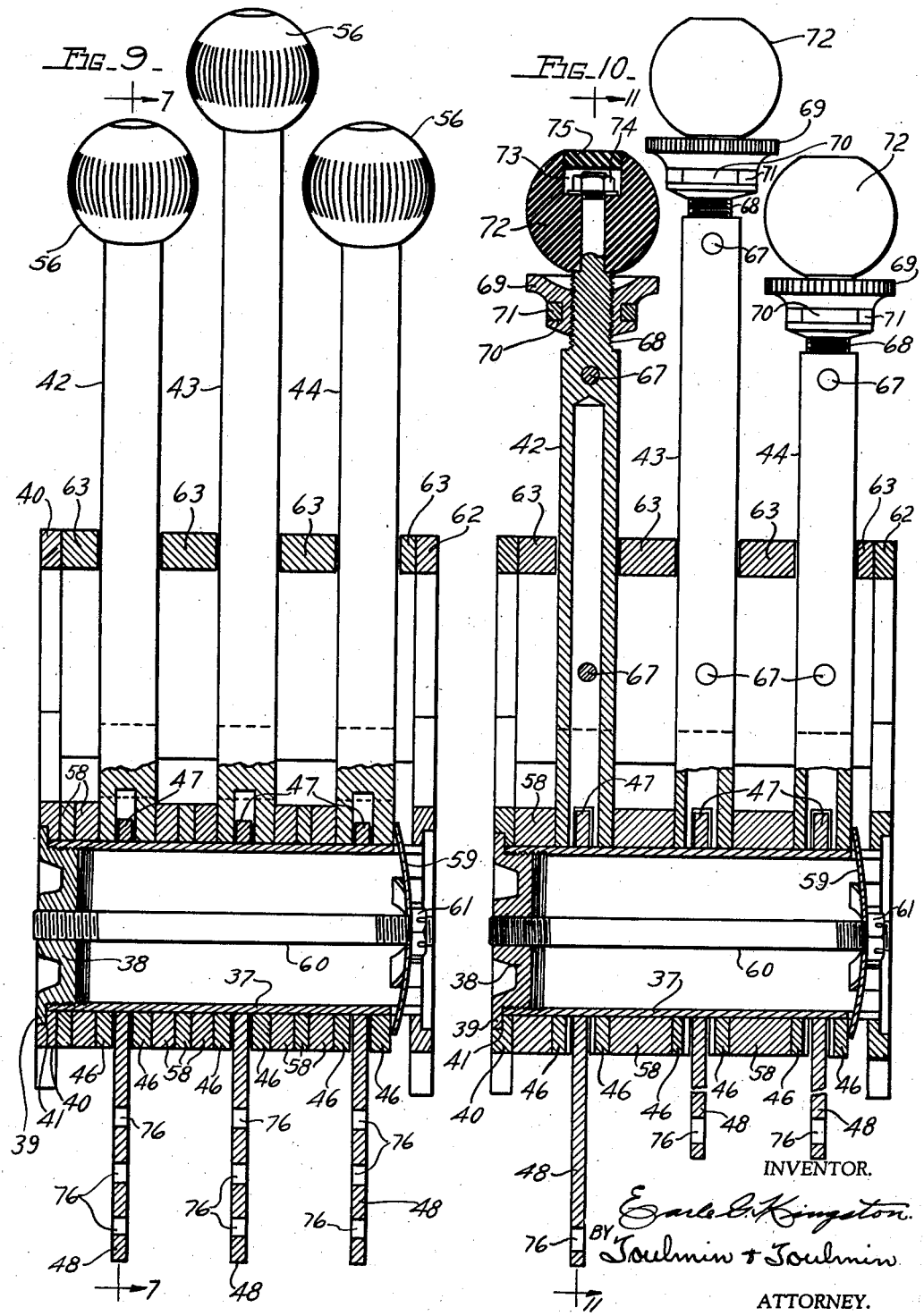

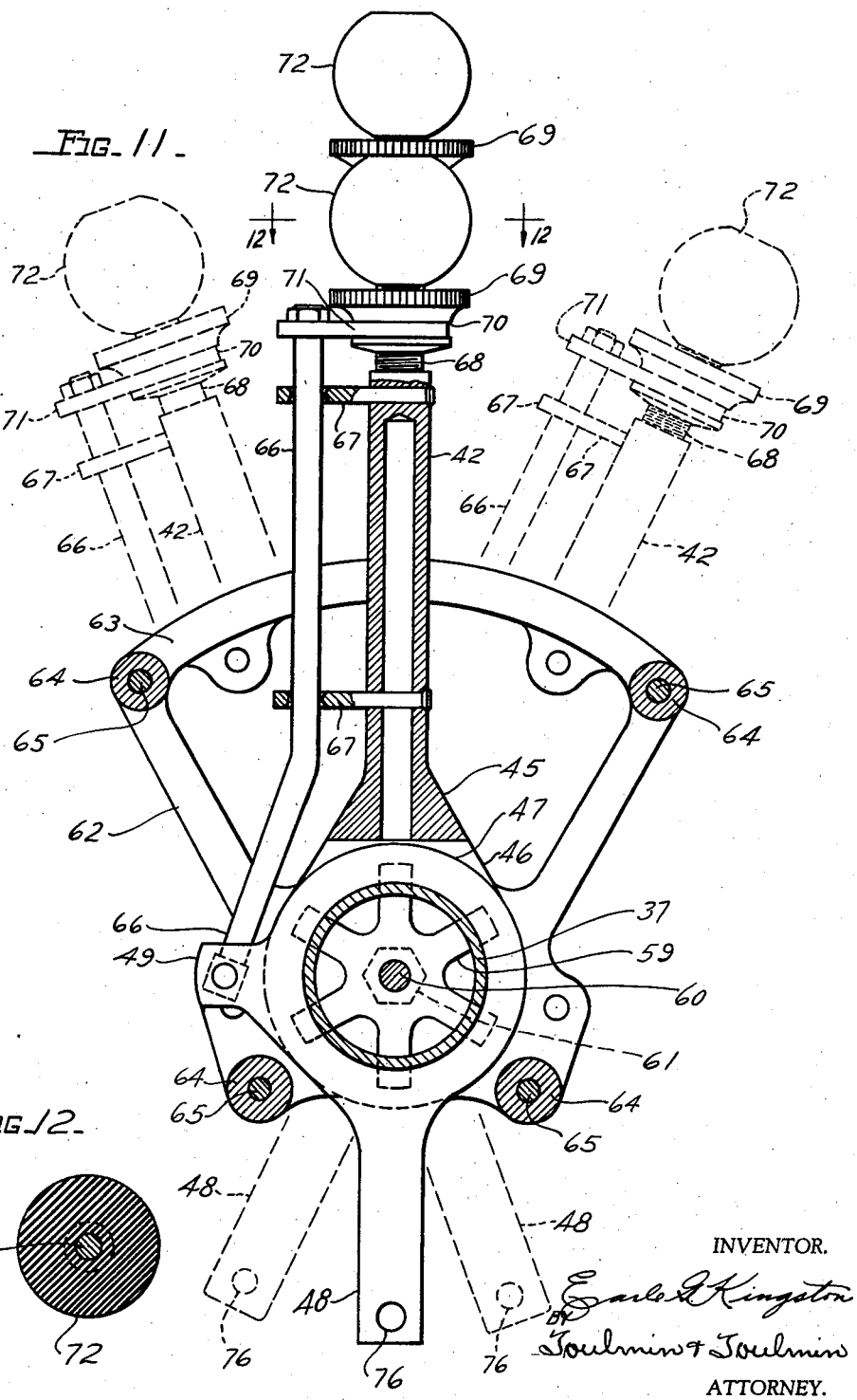

Patented Jan. 8, 1935

1,987,066

UNITED STATES PATENT OFFICE 1,987,066

VERNIER ADJUSTING CONTROL UNIT

Earle G. Kingston, Dundalk, Md., assignor, by mesne assignments, to General Aviation Manufacturing Corporation, Dundalk, Md., a corporation of Delaware Application January 30, 1933, Serial No. 654,237

11 Claims. (Cl. 74—530)

This invention relates to improvements in control units, and has for its object to provide a control unit for general purposes, but particularly adapted to be used in connection with airplanes for moving and controlling the various structures thereof.

It is particularly the object of this invention to provide a control unit which has a major adjustment and a minor micrometer adjustment cooperating with the major adjustments.

It is the object of this invention to provide, in connection with the control unit, a lever for producing a major adjustment and means connected with the lever for producing a minor and micrometer adjustment, the means for producing the minor or micrometer adjustment being part of the locking mechanism for holding the lever in any adjusted position.

These and other advantages will appear from the following description taken in connection with the drawings, such as:

To provide an airplane control for controlling various structures on an airplane; and to provide in such control means for a major adjustment and a minor micrometer adjustment.

To provide a control lever which may be locked in a predetermined position and then have a fine adjustment of its position made without unlocking it; and to continue that fine adjustment as it is moved to other positions.

To provide within a single hand control the means for moving the lever, for locking the lever and for giving a fine adjustment of the position of the lever, all without removing the hand from the lever.

To provide a pivoted adjusting lever and a micrometer screw pawl for adjusting the position of the lever with respect to its detent in which the pawl has already engaged.

The provision of a plurality of levers supported on the same shaft and independently adjustable with independent adjustment of the relationship of the lever with the mechanism they actuate.

Referring to the drawings:

Figure 1 is a front elevation of one form of control unit.

Figure 2 is a side elevation of the form shown in Figure 1.

Figure 3 is a section on the line 3—3 of Figure 1.

Figure 4 is a section on the line 4—4 of Figure 1.

Figure 5 is a section on the line 5—5 of Figure 1.

Figure 6 is a view similar to Figure 1 but showing in full line one adjustment and in dotted lines connected with the full line, showing a micrometer adjustment. This figure also shows in dotted lines a second major adjustment.

Figure 7 is a section on the line 7—7 of Figure 9.

Figure 8 is a section on the line 8—8 of Figure 7.

Figure 9 is a side elevation of the form shown in Figure 7, with the hub and the adjacent structure shown in section.

Figure 10 shows a modified form of control unit with one of the levers, the supporting hub and the adjacent structure shown in section.

Figure 11 is a section on the line 11—11 of Figure 10.

Figure 12 is a section on the line 12—12 of Figure 11.

Figure 13 shows a turn for vernier.

In the form shown in Figure 1 a triangular frame 1 is provided with holes 2 therein for receiving bolts by which the frame may be attached to any object. At the outer ends of the two upper arms of the frame are studs 3, one for each arm. These studs have attached thereto a sector or notched arcuate bar 4 by means of screws 5, which extend through the bar into the studs. This bar has on one edge notches 6.

Extending from the central part of the frame at the point where the arms of the frame meet is a sleeve 7. Extending through this sleeve and the frame from which the sleeve projects is a hole 8, which has therein a tubular shaft 9 fastened by means of a pin 10. On this shaft is a head 11, which has its lower end bifurcated to form spaced plates 12, between which is located a cross arm 13 fastened to the plates by means of screws 14. The plates and the cross arm have holes to receive the tubular shaft 9.

The upper part of the head 11 is formed into a hollow stem 15, which has therein a hole 16. Over this hollow stem fits one end of a tube 17, which forms the main part of the operating lever, and for purposes of convenience may be designated as a lever. Within this lever or tube 17 is a tube 18, and extending through the tubes 17 and 18 are slots 19 in which the sector or arcuate bar is located.

Affixed to the lower end of the tube 18 is a shaft 20 which projects through slots 21 in the walls of the tube 17. By means of these slots the tube 18 and the shaft 20 may move longitudinally with relation to the lever or tube 17. The shaft 20 serves as a support for a pawl 22, which is attached at one end to the shaft in any suitable manner and has projecting laterally therefrom, in an upward direction, a knob 23 adapted to engage the notches on the under side of the sector or arcuate bar 4 for holding the lever in various positions of adjustment with respect to the sector or arcuate bar.

Located within the hole 16 and engaging the under side of the pawl is a spring 24, which urges the pawl, the tube 18 and the shaft 20 upwardly so that the knob will fit in one of the notches in the arcuate bar. The upper end of the spring 24 fits around a projection 25 extending downwardly from the pawl beneath the knob 23.

At one side of the tube or lever 17 is a vernier rod 26, which has on its lower end a projection 27 with a reduced end 28 fitting through a suitable hole in the end of the pawl remote from the shaft 20 and held in engagement therewith by means of a suitable pin 29. The upper end of this vernier rod is guided by means of a guide 30 attached to the upper end of the tube 18.

The vernier rod has on it adjacent the guide 30 a stop 31, which is adapted to engage the guide and limit the upward movement of the vernier rod. On the upper end of the vernier rod is a yoke 32 held thereon by means of a nut 33. The yoke 32 fits between two shoulders 34, formed integral with a screw 35 which is threaded into the upper end of the tube 18 and adapted to move longitudinally in the tube by rotation. On the upper end of this screw is a head 36 by which the screw may be rotated.

In order to shift the lever with relation to the arcuate bar or sector 4 the head is pressed downwardly. This downward movement of the head carries with it the tube 18 and the shaft 20 so that the pawl is released from the notches in the sector, after which the lever may be adjusted along any point of the arcuate bar. A release of the head will cause the pawl to engage one of the notches through the action of the spring 24.

In order to produce a finer adjustment of the lever and the arm 13 operated thereby, the head may be rotated so that the pawl is rotated on the shaft 20. This rotation of the pawl on the shaft 20 causes the knob to act as a fulcrum for a slight movement of the lever with relation to the sector or arcuate bar. This movement effects a micrometer adjustment of the arm 13.

In the form shown in Figures 7 and 9 the supporting frame is slightly different from that shown in Figure 1. In this form there is a hub 37, which has threaded in one end a retainer disc 38 with a peripheral flange 39 fitting over the end of the hub. Around the end of the hub adjacent the flange is a plate 40, which acts as one end of the frame. This plate has therein a seat 41 for receiving and seating the flange 39. Mounted upon this hub is a plurality of levers. In the present instance there are three of these levers, 42, 43 and 44.

The lower end of each lever has an enlarged part 45, which has a hole therein for receiving the hub. The large lower end of each lever is bifurcated and formed into spaced arms 46, which have located between them on the hub a plate 47. From this plate there extend two arms, one 48 for connecting with the object to be operated, and the other 49 substantially at right angles to the first arm. To the arm 49 is attached one end of a clevis 50. The other end of this clevis has a threaded hole therein to receive the threaded end 51 of a rod 52. This rod 52 extends longitudinally through the lever 42, as shown in Figure 7. Similar rods are provided for the levers 43 and 44.

On the lower end of the rod 52 is a shoulder 53 which engages the lower end of the hollow part of the lever to prevent upward movement of the rod 52. Downward movement of the rod 52 is prevented by means of a nut 54 threaded on the upper end of the rod 52. The upper end 55 of the rod 52, beyond the nut 54, is flat, as shown in Figure 8. On this flat end of the rod is a head 56, held by means of a pin 57. This head may be formed of any suitable material.

By rotating the head the rod 52 rotates and causes the clevis to move on the threaded end of the rod so that the plate 47 will rotate on the hub and cause the arm 48 to swing. On the hub and on opposite sides of the levers are spacers 58 for holding the levers in spaced relationship with each other, and in spaced relationship with the frame mounted upon the hub. On the end of the hub remote from the retainer disc 38 is a spring 59 held thereon by means of a bolt 60 threaded at one end into the retainer disc, the other end of the bolt extending through the spring and engaged by a nut 61.

On the other end of the hub from the plate 40 is a plate 62, and between each adjacent lever is a sector 63 serving to guide the levers in their movements. These sectors are held in spaced relationship to each other by means of spacers 64. Through the sectors, the spacers and the plates 40 and 62 extend bolts 65 for holding these members upon the hub and in assembly therewith.

Whenever it is desired to adjust one of the arms 48 one of the levers 42, 43 or 44 is moved. This provides for a coarse adjustment, and in order to obtain a finer and more delicate adjustment the head 56 is rotated so that the clevis 50 is slightly moved for a fine adjustment. Suitable means may be provided for holding the levers with relation to the sectors.

In the form shown in Figures 10 and 11 the levers are of the same general form but instead of having the vernier rod 52 extending up through the center of the lever, other means is provided for the micrometer adjustment of the plates 47. In this form the vernier rod 66 is guided by means of guides 67, suitably attached to the levers, two to each lever. The plates are supported by a hub similar to that shown in Figure 9, and have two arms 48 and 49. To the arm 49 the lower end of the vernier rod 66 is attached.

The upper end of each lever is threaded at 68 and has thereon a vernier wheel 69, with a slot 70 therein to receive one end of a yoke 71, the other end of which is attached to the upper end of the rod 66 so that any rotation of the vernier wheel will cause the rod to move up and down and oscillate the arm 48 through the oscillation of the arm 49. On the upper end of the lever above the vernier wheel is a ball 72, which has in its upper end a recess 73 for receiving a nut 74 on the end of the lever for holding the ball in place. The recess is closed by means of a closure 75. The arms 13 and 48 have holes 76 therein by means of which these arms may be connected to any part to be operated.

It will be understood that I desire to comprehend within my invention such modifications as come within the scope of my claims and my invention.

Having thus fully described my invention, what I claim as new and desire to secure by Letters Patent, is:

1. In a control unit, a frame having thereon a bar with notches therein, an arm pivoted to the frame, means movable along the bar to swing the arm, means on said means to engage the bar in the notches to hold said means in adjusted position on the bar, a head rotatably mounted on the first named means and means to operate the last-named means to move the first-named means to give the arm a micrometer adjustment.

2. In a control unit, a frame having thereon a notched arcuate bar, an arm pivoted at one end on the frame, a lever pivoted to the frame and connected to the arm to swing it, a pawl pivoted to the lever and having thereon a knob to fit in the notches of said bar, a head rotatably mounted on one end of the lever, and means movable longitudinally of the lever and operated by the head to rock the pawl to move the lever and give a micrometer adjustment to the arm.

3. In a control unit, a frame having thereon a bar with notches therein, an arm pivotally mounted on the frame, means pivoted with relation to the arm and adapted to engage in any notch of the bar and be rocked in the notch to move the arm, and means on the arm and movable longitudinally thereof for rocking the pivoted means.

4. In a control unit, a frame having thereon a bar with notches, a lever having a pawl thereon for engaging with the bar in the notches, means to move the pawl longitudinally of the lever to release the pawl from a notch, and means movable longitudinally of the lever to rock the pawl whereby when the pawl is in a notch the lever may be moved along the bar.

5. In a control unit, a frame having thereon a bar with notches therein, a head pivoted to the frame, an arm on the head, a hollow stem on the head, a tubular lever having one end fitting over the hollow stem, a tube in the tubular lever, the tubular lever and the tube having slots to receive the bar, a pawl pivoted to the tube, said pawl having thereon a knob to fit in the notches on the bar, a spring in the hollow stem engaging the pawl to hold the knob in the notches, and means to rock the pawl so that when the knob is in any notch the lever may be moved along the bar.

6. In a control unit, a frame having thereon a bar with notches therein, a head pivoted to the frame, an arm on the head, a hollow stem on the head, a tubular lever having one end fitting over the hollow stem, a tube in the tubular lever, the tubular lever and the tube having slots to receive the bar, a pawl pivoted to the tube, said pawl having thereon a knob to fit in the notches on the bar, a spring in the hollow stem engaging the pawl to hold the knob in the notches, and means on the tube to rock the pawl so that when the knob is in any notch the lever may be moved along the bar.

7. In a control unit, a frame having thereon a bar with notches therein, a head pivoted to the frame, an arm on the head, a hollow stem on the head, a tubular lever having one end fitting over the hollow stem, a tube in the tubular lever, the tubular lever and the tube having slots to receive the bar, a pawl pivoted to the tube, said pawl having thereon a knob to fit in the notches on the bar, a spring in the hollow stem engaging the pawl to hold the knob in the notches, and means threaded in the tube to rock the pawl so that when the knob is in any notch the lever may be moved along the bar.

8. In a control unit, a frame having thereon a bar with notches therein, a head pivoted to the frame, an arm on the head, a hollow stem on the head, a tubular lever having one end fitting over the hollow stem, a tube in the tubular lever, the tubular lever and the tube having slots to receive the bar, a pawl pivoted to the tube, said pawl having thereon a knob to fit in the notches on the bar, a spring in the hollow stem engaging the pawl to hold the knob in the notches, and means to rock the pawl so that when the knob is in any notch the lever may be moved along the bar, said means comprising a rod attached at one end to the pawl, a yoke on the other end of the rod and means on the tube engaging the yoke to move the rod longitudinally.

9. In a control unit, a frame having thereon a bar with notches therein, a head pivoted to the frame, an arm on the head, a hollow stem on the head, a tubular lever having one end fitting over the hollow stem, a tube in the tubular lever, the tubular lever and the tube having slots to receive the bar, a pawl pivoted to the tube, said pawl having thereon a knob to fit in the notches on the bar, a spring in the hollow stem engaging the pawl to hold the knob in the notches, and means to rock the pawl so that when the knob is in any notch the lever may be moved along the bar, said means comprising a rod attached at one end to the pawl, a yoke on the other end of the rod and means threaded on the tube engaging the yoke to move the rod longitudinally.

10. In a control unit, a frame having thereon a bar with notches therein, a tubular lever pivotally supported at one end on the frame, a tube slidably mounted in the tubular lever, the tubular lever and the tube having a slot therein to receive the bar, a pawl pivoted at one end to the tube, a knob on the pivoted end of the pawl to engage the bar in the notches, means tending to hold the knob in the notches, a rod attached at one end to the other end of the pawl, a guide for the other end of the rod on the tube, a yoke on the rod, and means on the tube engaging the yoke to move the rod so that the pawl with the knob in a notch may be rocked to move the lever along the bar.

11. In a control unit, a frame having thereon a bar with notches therein, a tubular lever pivotally supported at one end on the frame, a tube slidably mounted in the tubular lever, the tubular lever and the tube having a slot therein to receive the bar, a pawl pivoted at one end to the tube, a knob on the pivoted end of the pawl to engage the bar in the notches, means tending to hold the knob in the notches, a rod attached at one end to the other end of the pawl, a guide for the other end of the rod on the tube, a yoke on the rod, and means on the tube engaging the yoke to move the rod so that the pawl with the knob in a notch may be rocked to move the lever along the bar, said means including a screw threaded in the tube and having thereon spaced shoulders between which the yoke fits.

EARLE G. KINGSTON.